(12) United States Patent
Hangartner

(10) Patent No.: US 6,463,422 B1
(45) Date of Patent: *Oct. 8, 2002

(54) PROBABILISTIC COMPUTING METHODS AND APPARATUS

(76) Inventor: Ricky D. Hangartner, 725 NW. Flanders #206, Portland, OR (US) 97209

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/898,528

(22) Filed: Jul. 22, 1997

Related U.S. Application Data

(63) Continuation of application No. 08/296,654, filed on Aug. 26, 1994, now Pat. No. 5,680,518.

(51) Int. Cl.[7] .................................. G06N 3/02
(52) U.S. Cl. .............................. 706/14; 706/52; 706/45
(58) Field of Search ............................... 706/13, 52, 45

(56) References Cited

U.S. PATENT DOCUMENTS

| | | | | |
|---|---|---|---|---|
| 3,812,473 | * | 5/1974 | Tucker ....................... | 711/151 |
| 5,148,513 | * | 9/1992 | Koza et al. ................... | 706/13 |
| 5,390,282 | * | 2/1995 | Koza et al. ................... | 706/13 |
| 5,680,518 | * | 10/1997 | Hangartner .................. | 706/52 |
| 5,742,738 | * | 4/1998 | Koza et al. ................... | 706/13 |
| 5,812,740 | * | 9/1998 | Scepanovic et al. .......... | 706/45 |
| 5,835,381 | * | 11/1998 | Scepanovic et al. ........ | 364/491 |
| 5,844,811 | * | 12/1998 | Scepanovic et al. ........ | 364/491 |

OTHER PUBLICATIONS

Broder, et al, On the Satisfiability of andom 3–CNF Formulas, Proceedings of the ACM–SIAM Symposium on Discrete Algorithms, 1993, pp. 322–330, Jan. 1993.*

Di Giacomo, Joseph, VLSI Handbook, McGraw–Hill Publishing Company, 1989, pp. 4.1–4.9, Jan. 1989.*

Horowitz et al, The Art Of Electronics, Cambridge University Press, 1989, p. 507, Jan. 1989.*

Millman, Jacob, Microelectronics: Digital and Analog Circuits and Systems, McGraw–Hill Publishing Company, 1979, pp. 282–296, Jan. 1979.*

Broder, Andrei Z., et al., On the Satisfiability of Random 3–CNF Formulas, Proceedings, of the ACM–SIAM Symposium on Discrete Algorithms, 1993, pp. 322–330, Jan. 1993.*

Millman, Jacob, MICROELECTRONICS: Digital and Analog Circuits and Systems, 1979, pp. 205–206, Jan. 1979.*

Broder, A.Z.; Dolev, D., Flipping Coins In Many Pockets (Byzantine Agreement On Uniformly Random Values), Foundations of Computer Science, 1984. 25th Annual Symposium on, pp.: 157–170, Jan. 1984.*

(List continued on next page.)

*Primary Examiner*—Kevin J. Teska
*Assistant Examiner*—Wilber Starks
(74) *Attorney, Agent, or Firm*—Stoel Rives LLP

(57) ABSTRACT

A new probabilistic computing system (PCS) provides computational functionality needed to efficiently realize randomized computing methods in otherwise standard, deterministic digital computing systems. The PCS may be incorporated in a standard computing platform such as a PC or workstation. In the PCS, a computational path includes a random access memory (RAM) where a predetermined computing problem is stored in conjunctive normal form. A nondeterministic subsystem generates random binary values forming a proposed solution to the problem, which solution is rapidly checked through a crosspoint switch array coupled to the RAM. The computational path essentially runs asynchronously, while a delay circuit provides delay and timing signals for interfacing with external DRAM, as well as a synchronizing signal for operation of several of the PCS systems together for enhanced performance.

10 Claims, 12 Drawing Sheets

OTHER PUBLICATIONS

Brown, S.; Rose, J., FPGA and CPLD architecture: a tutorial, IEEE Design & Test of Computers Volume: 13 2, Summer 1996, pp.: 42–57, Jan. 1996.*

Richard M. Karp and Avi Wigderson, A fast parallel algorithm for the maximal independent set problem; J. ACM 32, 4 (Oct. 1985), pp. 762–773.

Krishnamurthy, B.; Tollis, I.G., Improved techniques for estimating signal probabilities, Computers, IEEE Transactions on, vol. 38 7, Jul. 1989, pp.: 1041–1045.

Di Giacomo, Joseph, VLSI Handbook, McGraw Hill Publishing Company, 1989, pp. 4.1–4.9, Jan. 1989.

Signetics Corporation, Signetics Data Manuel, 1976, pp. 57–62, Jan. 1976.

Hamacher, V. Carl, Computer Organization, Second Edition, McGraw–Hill Publishing Company, 1978, pp. 537–538, Jan. 1978.*

Gear, C. William, Introduction to Computers, Structured Programming, and Applications, Module A: Applications and Algorithms in Science and Engineering, Science Research Associates, Inc., A Subsidiary of IBM, 1978, pp. A55, Jan. 1978.*

Koza, John R. Genetic Programming: On the Programming of Computers by Means of Natural Selection. MIT Press, Cambridge, Massachusetts, Jan. 1, 1992.*

Millan, Jacob, "Microelectronics: Digital and Analog Circuits and Systems", McGraw Hill Book Company, 1979, pp. 208–209, Jan. 1979.*

Mano, Morris, "Computer System Architecture, Second Edition", Prentice Hall, p. 7, Jan. 1982.*

* cited by examiner

PROBABILISTIC COMPUTING METHODS AND APPARATUS

This application is a continuation of application Ser. No. 08/296,654, filed Aug. 26, 1994, now U.S. Pat. No. 5,680,518.

BACKGROUND OF THE INVENTION

For each combinatoric computing problem which focuses on finding an appropriate value assignment for the variables in the problem, a corresponding decision problem can be constructed which seeks a YES-NO answer as to whether a candidate assignment for the variables is actually a solution to the combinatoric problem. Nondeterministic Polynomial Time complete (NP-complete) decision problems are those for which no efficient solution method is known, in the sense that the number of steps in the solution method is a polynomial function of the size of the smallest representation of the problem (referred to as "polynomial-time"), but for which a candidate guess of the solution can be checked in polynomial time. It is known that all NP-complete problems are polynomial-time Karp-reduction equivalent, i.e., any instance of a particular NP-complete problem can be mapped in a polynomial time into an instance of some other NP-complete problem such that the solutions of this problem correspond to solutions of the original problem under the mapping.

Randomized computing methods incorporate probabilistic decision making techniques in addition to deterministic techniques and provide a solution to the problem which is correct with some minimum and selectable probability. Although it is believed that no deterministic, polynomial-time solution method exists for NP-Complete problems, it is known that the class PP of decision problems solvable in polynomial time by randomized computing methods includes the NP-complete problems. See "Structural Complexity I" by J. L. Balcazar, J. Diaz and J. Gabarro.

In the prior art, simulated annealing methods so-called Boltzmann machines have been referred to as randomized computing systems. See "Optimization by Simulated Annealing" by S. Kirkpatrick, C. D. Gelett and M. P. Vecchi; "A Thermodynamic Approach to the Traveling Salesman Problem: An Efficient Simulation" by V. Cerny, and "Boltzmann Machines: Constraint Satisfaction Networks that Learn" by G. E. Hinton, T. J. Sejnowski and D. H. Ackley. These methods differ from the present invention, however, in that they are more properly identified as heuristic methods for solving combinatorial computing problems. Although some versions of these methods do incorporate probabilistic decision techniques, the solutions they provide in polynomial-time are not guaranteed to be correct with some minimum selectable probability. The prior art does not appear to include any computing systems which efficiently realize randomized computing methods in the formal rigorous sense defined above.

SUMMARY OF THE INVENTION

The probabilistic computing system (PCS) of the present invention provides the computational functionality needed to efficiently realize randomized computing methods in otherwise standard, deterministic digital computing systems. The PCS may be incorporated in a standard computing platform such as a PC in various ways. For example, for applications requiring moderate performance, a VLSI probabilistic computation network chip, further described below, can be combined with standard dynamic RAMs and used as a memory-mapped peripheral. In such a configuration, multiple PCS-DRAM modules can be interconnected for increased processing power. For higher performance applications, a peripheral device analogous to a mass memory peripheral (for example a hard disk) can be constructed by combining multiple PCS chips with dynamic RAM and interface logic. The disclosed invention allows solution of computing problems that heretofore could not be practically solved in small systems.

A probabilistic computing system according to the invention includes a memory for receiving and storing a digital representation of a predetermined combinatorial computing problem. The problem is expressed as a series of clauses in conjunctive normal form. In the preferred embodiment, the memory includes a plurality of rows of memory cells, each row arranged for storing a series of data bits corresponding to a respective clause of the computing problem. Each row stores a series of pairs of bits, each bit pair corresponding to a respective one of the variables and its logical complement.

A nondeterministic logic subsystem is provided for generating a set of random boolean values of the variables as a first proposed solution to the stored computing problem. Testing circuitry is coupled to the memory and to the nondeterministic logic means for testing whether the first set of random boolean values satisfies the stored computing problem. Finally, a feedback circuit couples the testing circuit and to the nondeterministic logic subsystem for controlling the ND subsystem so as to generate an alternative set of random boolean values of the series of variables as an alternative proposed solution to the computing problem whenever the testing circuit indicates that the computing problem is not satisfied. Thus the nondeterministic subsystem, the testing circuit and the feedback circuit together form a hardware loop for asynchronous operation. The system preferably is run asynchronously to maximize speed.

The nondeterministic subsystem includes a series of semiconductor nondeterministic logic elements. Each ND logic element includes a cross-coupled pair of inverting gates arranged for generating a respective one of the random boolean values of the series of variables, responsive to the variety of noise sources intrinsic to VLSI circuits.

The testing circuit includes, for each row of the memory means, a wide "programmable" NOR gate. The NOR gate provides a computed function signal (Cn) that indicates whether the proposed series of random boolean values satisfies the corresponding clause of the computing problem. Each bit of the data stored in the memory determines whether or not a corresponding one of the variables is included as an input to the NOR gate. In this way, the NOR gate is programmed to reflect the clause of the problem stored in that row of the memory.

Thus, the first wide NOR gate may be considered as part of a crosspoint switch array overlying the memory. The crosspoint switch array includes a series of crosspoint switch circuits, each crosspoint switch circuit being coupled to a respective bit of the corresponding row of the memory. Each crosspoint switch circuit also receives the corresponding variable signal from the corresponding ND logic element. In operation, each crosspoint switch circuit couples the corresponding probabilistic variable signal to a common circuit node—the NOR gate input—only if the said respective bit has a first predetermined logic state.

Accordingly, the programmable NOR gate in each row asserts the corresponding computed function signal responsive to such of the probabilistic variable signals as are coupled to the NOR input by the crosspoint switch circuits so as to indicate whether the first series of random probabilistic variable values satisfies the corresponding clause of the computing problem.

A second wide NOR gate is coupled to receive all of the computed function signals (C1–Cq) for determining and indicating whether the proposed solution satisfies the computing problem. This is true only when all of the computed function signals indicate that the corresponding clauses of the problem are satisfied. Accordingly, the second NOR gate has a number of inputs at least equal to the number of clauses in the computing problem. The output of the second NOR gate is used in the feedback circuit to trigger another set of values if the problem is not yet satisfied. A delay circuit in the feedback circuit provides for writing intermediate results to a DRAM.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

I. Introduction

The present invention is most useful for solving a combinatorial computing problem having a large number of variables. For example, if a computing problem has 1000 independent variables, a deterministic process for solving the problem may require either a very large computer in terms of memory space, or a very long time to carry out the computation. Probabilistic techniques essentially involve making a random "guess" at a solution, checking whether the proposed solution satisfies the problem, and repeating this process until a solution is found or a time limit is encountered. We assume a problem expressed in conjunctive normal form, i.e. as a series of clauses, each clause made up of literals (variables or their complements) logically OR'ed together. A proposed solution (or "guess") consists of defining the binary state or value of each one of the variables. Since these are chosen randomly, they will be called Probabilistic Variables (U1–Up, /U1–/Up) in the following description.

The heart of the apparatus described herein comprises a computational data path. In general, the computational data path includes a C-RAM and a Nondeterministic ("ND") subsystem consisting of a set of ND elements, both described in detail later. One ND element is provided for each probabilistic variable. The ND elements generate binary random values (and their complements), i.e. the "guesses" and the C-RAM quickly checks whether a set of values (i.e. a proposed solution) satisfies the problem presented. Parallel, asynchronous operation of the computational data path provides high performance, while an interface is provided for convenient use in a conventional microcomputer system or workstation. This brief introduction oversimplifies both the apparatus and the methodology of the invention, but is provided to give the reader a starting point for understanding the following more detailed description.

II. Interface Structures

Figure 1:
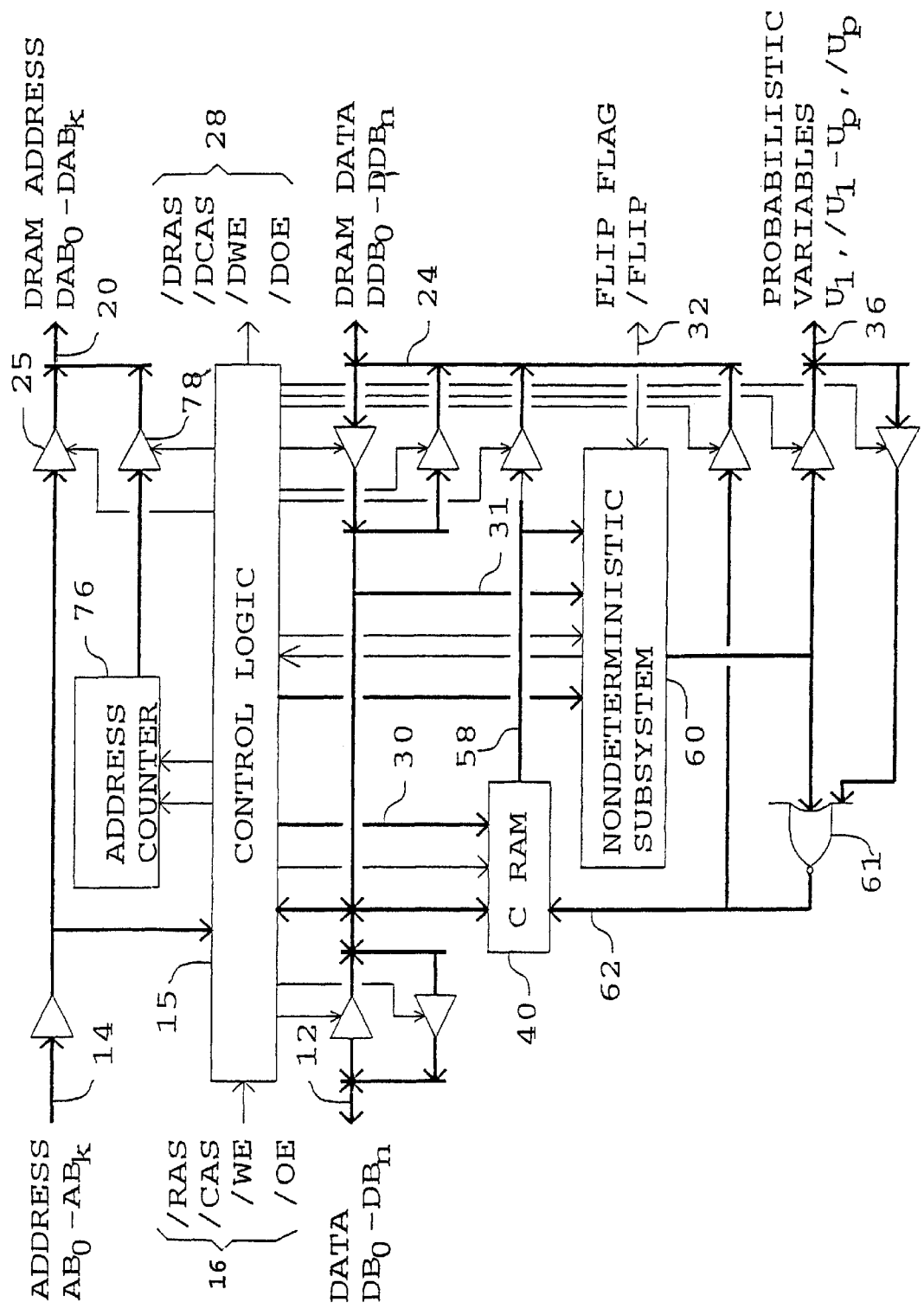
FIG. 1 is a system level diagram of a probabilistic computing system according to the present invention.

FIG. 1 is a system level diagram of a probabilistic computing system (PCS) according to the present invention. The system includes an external interface for interfacing with a host processor, a local DRAM array and other PCS devices, described as follows.

Three groups of interface signals for controlling and communicating with the PCS are provided. In the preferred embodiment, the PCS is implemented to be a memory-mapped peripheral device. Accordingly, the host processor interface is similar to a conventional, multi-bit wide DRAM interface. Referring to FIG. 1, parallel data for programming the PCS and for reading computation results are input and output on a data bus 12 comprising n+1 bits DB0–DBn. Addresses for accessing the internal RAM and the local external DRAM array are input on an address bus 14 comprising k+1 bits designated AB0–ABk. As shown in FIG. 1, buffered address signals from address bus 14 are input to control logic 15, and also are provided through a buffer 25 to the DRAM address bus 20 as bits DAB0–DABk.

Memory control signals 16 control the host processor interface. As with conventional DRAM, the upper and lower k+1 bits of a 2K+2-bit address are latched in the system by the row address strobe /RAS and the column address strobe /CAS. The transfer direction of an access operation is determined by the active low write enable /WE signal while the active-low output enable signal /OE gates output data to the data bus during read accesses.

To support a local DRAM array (not shown), the PCS also includes a local DRAM interface. Addresses for the local DRAM array are provided over DRAM address bus 20 as noted above. Data for the local DRAM array are provided over DRAM data bus DDB0–DDBn identified as bus 24. DRAM control signals include the DRAM row address strobe /DRAS, the DRAM column address strobe /DCAS, the active-low DRAM write enable /DWE and the active-low DRAM output enable /DOE collectively identified by reference number 28 in FIG. 1. These provide the control needed for reading and writing the local DRAM array under control of the control logic 15 as further described below.

The PCS optionally also includes a local expansion interface for networking multiple PCS systems to produce larger, higher performance systems. Each PCS system may be implemented as an individual integrated circuit, for example, or multiple systems may be integrated within a single device for increased density. Preferably, an array of PCS subsystems are arranged to interface with a host processor much like a mass-memory type peripheral system. The active low, open-drain /FLIP signal 32 ("FLIP FLAG") serves as a control signal for synchronizing an array of PCS subsystems. As explained in detail below, the active low level of the /FLIP eventually induces a low-high transition on /FLIP which starts a new computation cycle. Thus, "wire OR"-ing together the /FLIP signal of all PCS chips in an array automatically synchronizes their operation.

Probabilistic variables U1–Up and their complements /U1–/Up are bidirectional signals used to communicate data between the PCS chips in an array. These signals are communicated over bus 36. The asynchronous nature of these signals means that various array architectures can be constructed depending on the application requirements of the array. The only requirement is that each chip in the array be programmed so that only one chip drives each signal pair corresponding to a variable. The same variables form part of the internal computational data path as will be seen below. Bus signals are summarized on the following Table:

TABLE 1

Bus Signal Definitions

| 12 | SYSTEM DATA BUS | DB0-DBn | n + 1 |
|---|---|---|---|
| 14 | ADDRESS BUS | AB0-ABk | k + 1 |
| 20 | DRAM ADDR BUS | DAB0-DABk | K + 1 |
| 24 | DRAM DATA BUS | DDB0-DDBn | n + 1 |
| 58 | COMPUTED FUNCTIONS | C1-Cq | q |
| 36 | PROBABILISTIC VARIABLES | U1-Up,/U1-/Up | 2p |
| 62 | INVERTED PROBABILISTIC VARIABLES | A1-Ap,/A1-/Ap | 2p |

III. Computational Data Path

A. C-RAM

Figure 2:
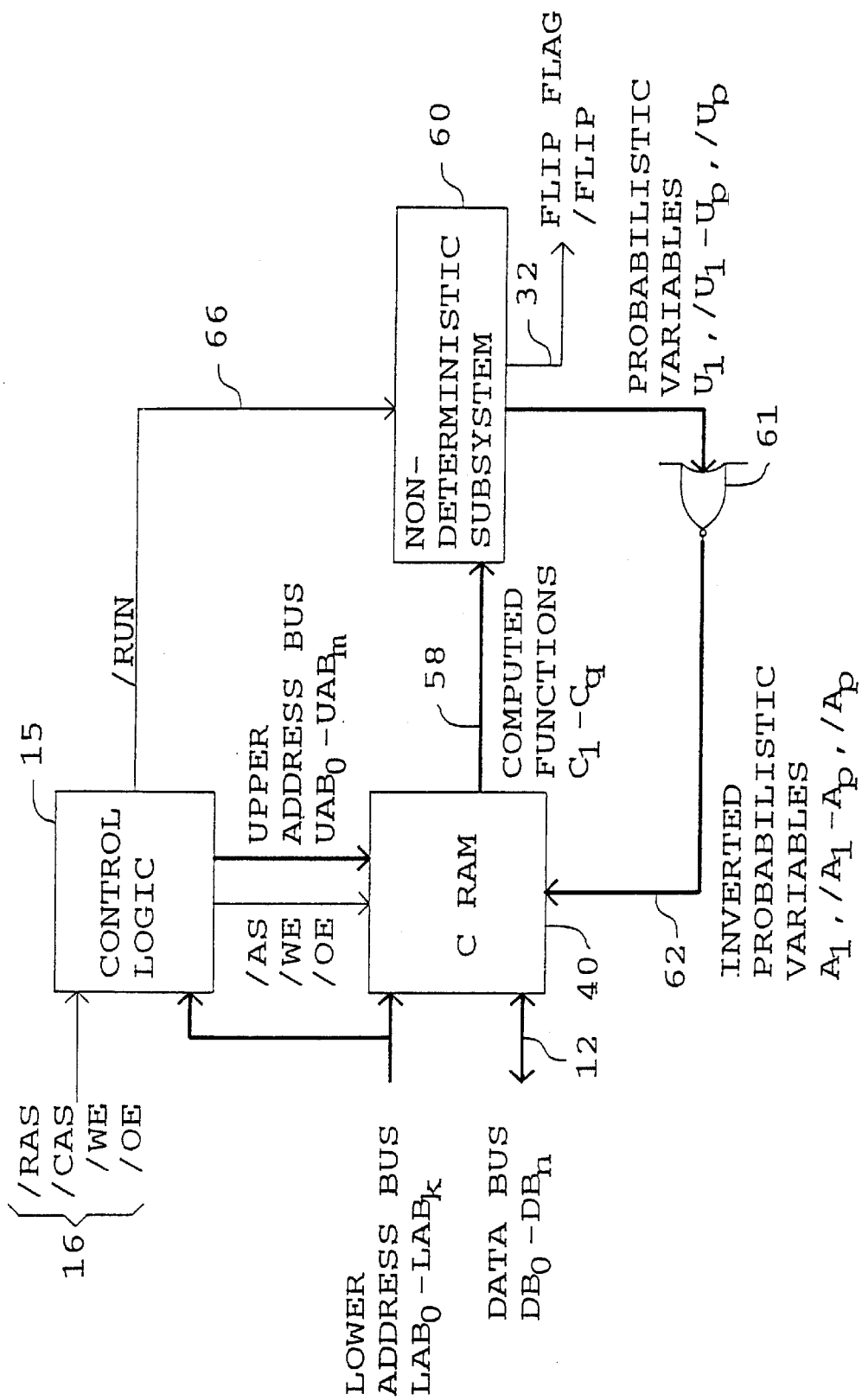
FIG. 2 is a simplified block diagram of a computational data path of the system of FIG. 1.

The computational data path, introduced above, is the portion of the PCS that asynchronously carries out the desired probabilistic computation. FIG. 2 is a simplified block diagram of the computational data path of the system of FIG. 1.

Referring to FIG. 2, the major components of the computational data path are a C-RAM 40 and a nondeterministic (hereafter "ND") subsystem 60. The ND subsystem 60 and related support logic are described in greater detail below with reference to FIG. 4.

Referring to FIG. 2, the ND subsystem 60 accepts as input on bus 58 a set of q bits or "Computed Functions" C1–Cq provided by the C-RAM 40 as explained below. Responsive to a /RUN signal 66 from control logic 15, the ND subsystem 60 generates a new set of p binary random values and their complements, U1–Up, /U1–/Up. These 2p values are inverted in a set of NOR gates 61, and the resulting Inverted Probabilistic Variables A1–Ap, /A1 - - - /Ap are provided over bus 62 to the C-RAM 40, thus completing a computational data path loop.

FIG. 2 also shows how the control logic 15, and address and data buses are coupled to the C-RAM 40. RAM 42 receives control signals 38 from control logic 15. These include address strobe /AS, write enable /WE and output enable /OE. RAM 42 also receives address data over address bus 30. Address bus 30 includes upper address bits UAB0–UABm and lower address bits LAB0–LABk for a total of k+m+2 address bits provided by control logic 15 as indicated in FIG. 1. RAM 42 also receives data bits DDB0–DDBn over data bus 12. As indicated in FIG. 1, data bus 12 is coupled to the DRAM data bus 24 for data transfer with the local DRAM.

Figure 3:
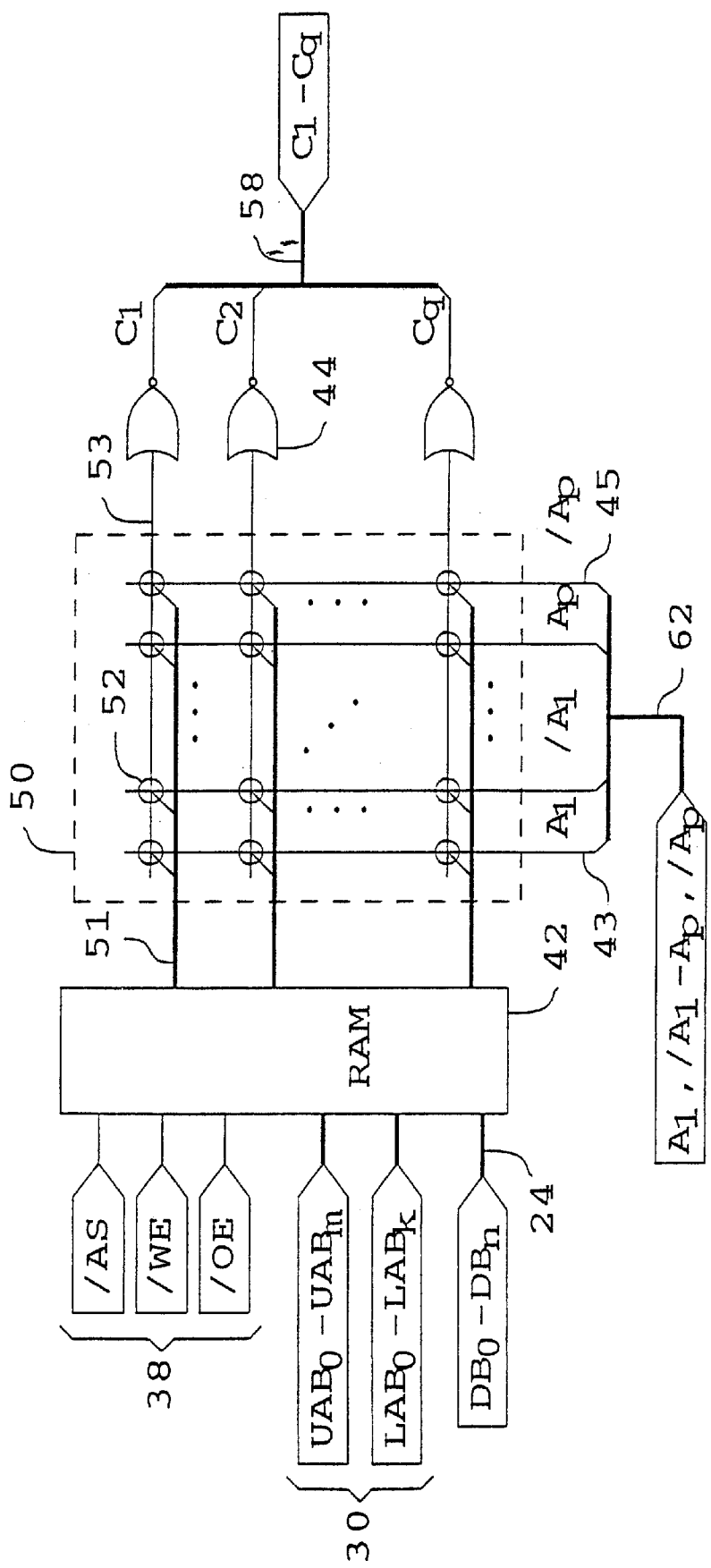
FIG. 3 is a conceptual diagram of the C-RAM portion of the computational data path.

FIG. 3 shows the C-RAM 40 in greater detail. The C-RAM essentially comprises a 2p bits wide by q rows RAM 42; a set of q 2p-input, "programmable NOR gates" referred to collectively as a crosspoint switch 50; and a series of q NOR gates, for example NOR gate 44, each corresponding to a respective row of the RAM, as described in detail later. By loading the RAM with the proper data, the crosspoint switch 50 is "programmed" to compute the logical NOR function of a desired subset of the inverted input variables A1–Ap, /A1 - - - Ap. (Note: the C-RAM actually computes the NOR function of the appropriate variables. The results of these computations are then NOR'ed together by NOR gate 65 to produce the D signal 170. This is logically equivalent to a CNF formula for D in which the appropriate variables are ORed together to produce the functions /C1, /C2, . . . /Cq and then ANDing these signals together to produce D.) Each clause is "programmed" in a corresponding row of RAM 42. Thus, each NOR gate corresponds to one clause of the computing problem presented. Each column in the RAM corresponds to one of the inverted probabilistic variables or its complement. Operation of the C-RAM is described in greater detail later in connection with a description of the preferred circuitry.

The following example shows how a problem expressed in conjunctive normal form is stored in the C-RAM. Conjunctive normal form is a series of clauses logically ANDed together, each of the clauses consisting of a series of variables, or literals, logically ORed together. A simple example is:

(U2 OR U5 OR /U6) AND (U1 OR /U3) AND (/U2 OR /U4 OR U6).

In this example, there are three clauses. Accordingly, this problem is stored in three rows of the C-RAM. In general, the RAM data format is: A1 /A1 A2 /A2 A3 /A3 . . . Ap /Ap where A(x) is the inverted probabilistic variable. So, for example, the first row in RAM, representing the first clause in the example above, contains the following data:

RAM contents at row 1: 0010000010010000000 . . .

Assuming the foregoing RAM contents, crosspoint switch 50 will connect inputs A2 and A5 and /A6 together (wired-OR) as input to the first row NOR gate. The output of the NOR gate is called a Computed Function C(1) (true=0). As shown in FIG. 3, all of the row NOR gates are disposed in parallel. All of the values are generated in parallel. All of the NOR gate outputs, computed functions C1–Cq, are output in parallel on bus 58 to the ND subsystem. The computed function is low for each clause which is satisfied.

B. Nondeterministic Subsystem

Figure 4:
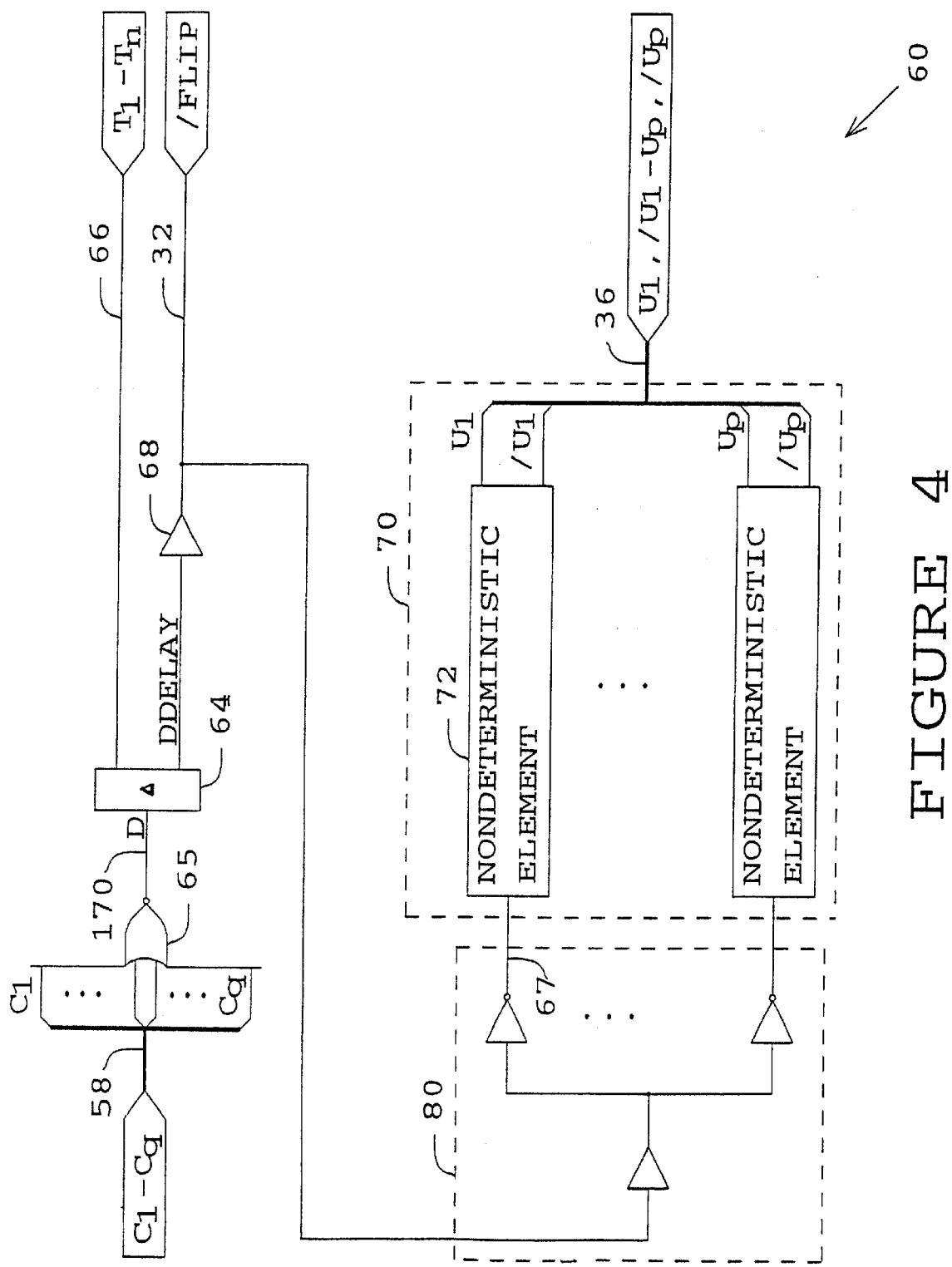
FIG. 4 is a simplified schematic diagram showing greater detail of a nondeterministic subsystem 60 of the computational data path.

FIG. 4 shows the ND subsystem 60 in greater detail. The computed functions C1–Cq are OR-ed together in NOR gate 65 to provide a signal D at node 170. Since each computed function C(n) is low if true, then all of them will be low only if all clauses of the problem stored in the C-RAM are satisfied. Accordingly, D=1 indicates a satisfactory solution to the whole problem. D is input to a delay circuit 64, described below, which in turn provides DRAM timing signals on bus 66 (T1–Tn) and output signal DDELAY which, through a buffer 68, provides the synchronization signal /FLIP 32.

The ND subsystem further includes a series of p individual ND logic elements 70, for example ND logic element 72. Each individual ND logic element driven by the variety of noise sources intrinsic to VLSI circuits, generates one of the probabilistic variables and its complement. For example, ND element 72 provides U1, /U1 as its outputs. These signals U1, /U1–Up, /Up are output in parallel on bus 36. The DDELAY signal fans out through a series of inverters 80 to form a series of control signals, e.g. at node 67, each control signal being coupled to a corresponding one of the individual ND elements. Control of the ND elements is described in detail later with reference to the associated control logic and timing diagrams.

Figure 5:
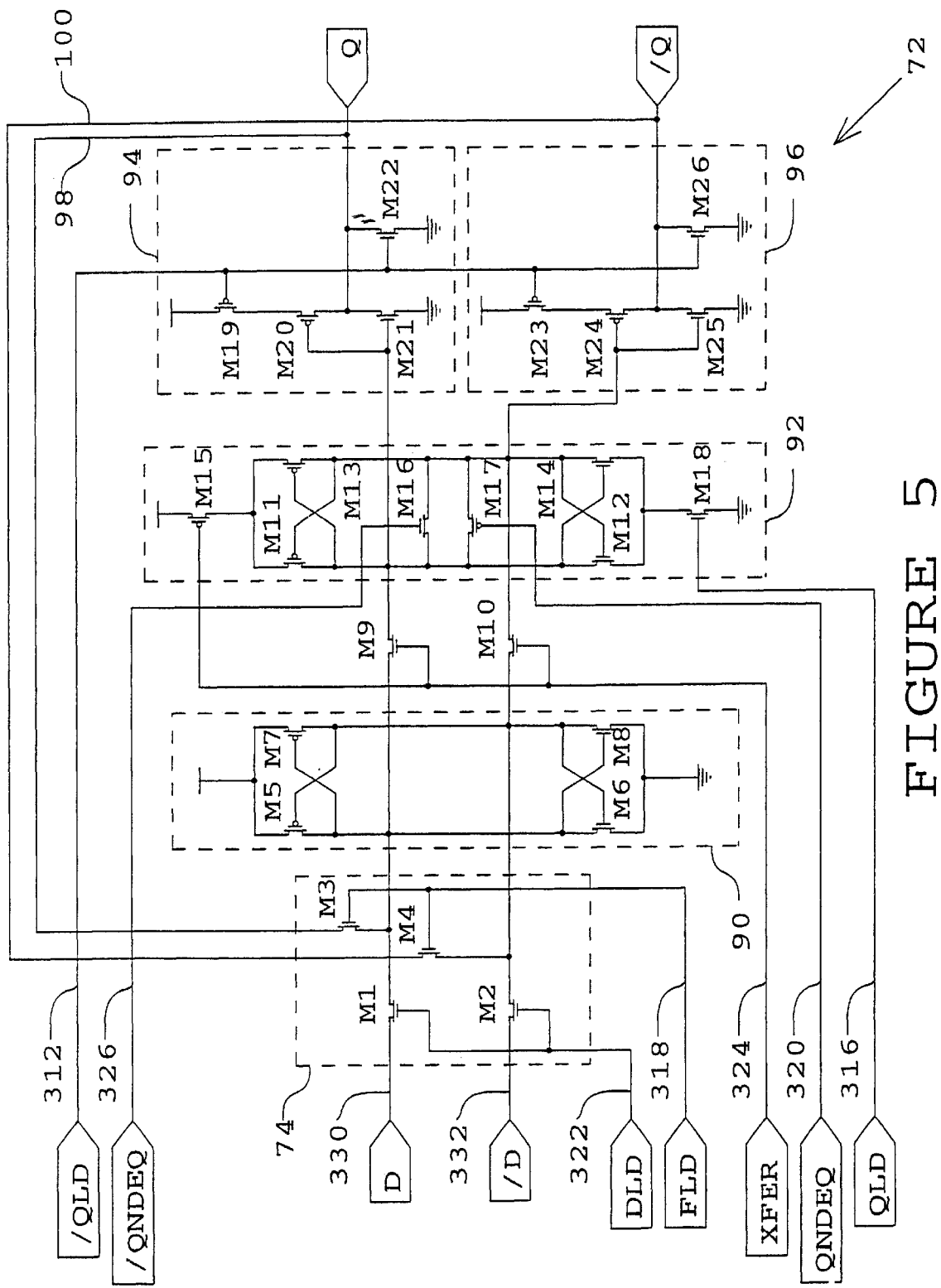
FIG. 5 is a transistor level schematic diagram of an individual nondeterministic element of the nondeterministic subsystem.

FIG. 5 is a transistor level schematic diagram of a representative one of the individual ND logic elements 72. Each ND logic element comprises an input multiplexer section 74, followed by a master stage 90, followed by a slave/ND stage 92, followed by output NOR gates 94,96. This circuit operates somewhat similar to a D-type flip-flop. It may be configured to follow data and then hold, responsive to a clock-type input, or to hold data and then follow. The "follow mode" is described first.

1. Predetermined (Deterministic) Mode of Operation

The circuitry shown and described can be configured to generate random values for all of the variables U1–Up. In the preferred embodiment, however, provision is made for a subset of the variables to be predetermined. Accordingly, the circuit of FIG. 5 provides master-slave operation to allow loading predetermined values for selected variables. Where such data is arriving from outside the PCS, the ND elements can be partitioned since only part of the data is nondeterministic. Those ND logic elements corresponding to predetermined values function as latches. To do so, master stage 90 followed by SLAVE/ND stage 92 provide a latch function, responsive to a transfer control signal XFER controlling the gates of transfer transistors M9,M10. control of gating transistors M15 through M18, as further described below. This is called the deterministic or flip-flop mode of operation. (All of the variables are included in U1 through Up and denominated "probabilistic variables" for simplicity.) In the flip-flop mode, the ND element generates new data by simply latching the input data D and /D received externally. Referring to FIG. 1, bus 31 is used to load data from the external DRAM into the ND subsystem 60. Referring again to FIG. 5, this data is input via the D (and /D) inputs.

2. Nondeterministic Mode of Operation

The nondeterministic mode of operation of the circuit of FIG. 5 is described next. In this mode, the ND element holds the previous random decision. Referring to the slave/ND stage 92, transistors M11 and M12 form a first inverter and transistors M13–M14 form a second inverter, arranged as a cross-coupled pair. Transistor M18 controls power to the cross-coupled pair. Transistors M16 and M17 are charge equalization transistors, together forming a transmission gate—a functional equivalent of a wire when both are turned on. In nondeterministic operation, transistors M16 and M17 are turned on while the power (M18) is turned off, so as to equalize charge on the gates between transistors M11 and M13. Thereafter, once transistors M15 and M18 are turned on and transistors M16–M17 are turned off, thermal noise will cause the cross-coupled pair of inverters to assume one of two stable states with unknown probability. The final state of the cross-coupled pair is then a probabilistically selected random value.

Transistors M19, M20, M21 and M22 together form a first NOR gate 94 which provides the Q output signal. Transistors M23, M24, M25 and M26 form a second NOR gate 96 that provides the /Q output signal. These NOR gates serve as inverters to force an inversion when the circuit is in an undetermined state. This has the effect of an ensuring valid logic levels as well as providing inversions needed for other parts of the circuit. Inverters could be used in this application but NOR gates are believed to provide better reliability. Each Q output provides a corresponding one of the probabilistic variables Un and the /Q output provides the complement /Un.

Figure 6:
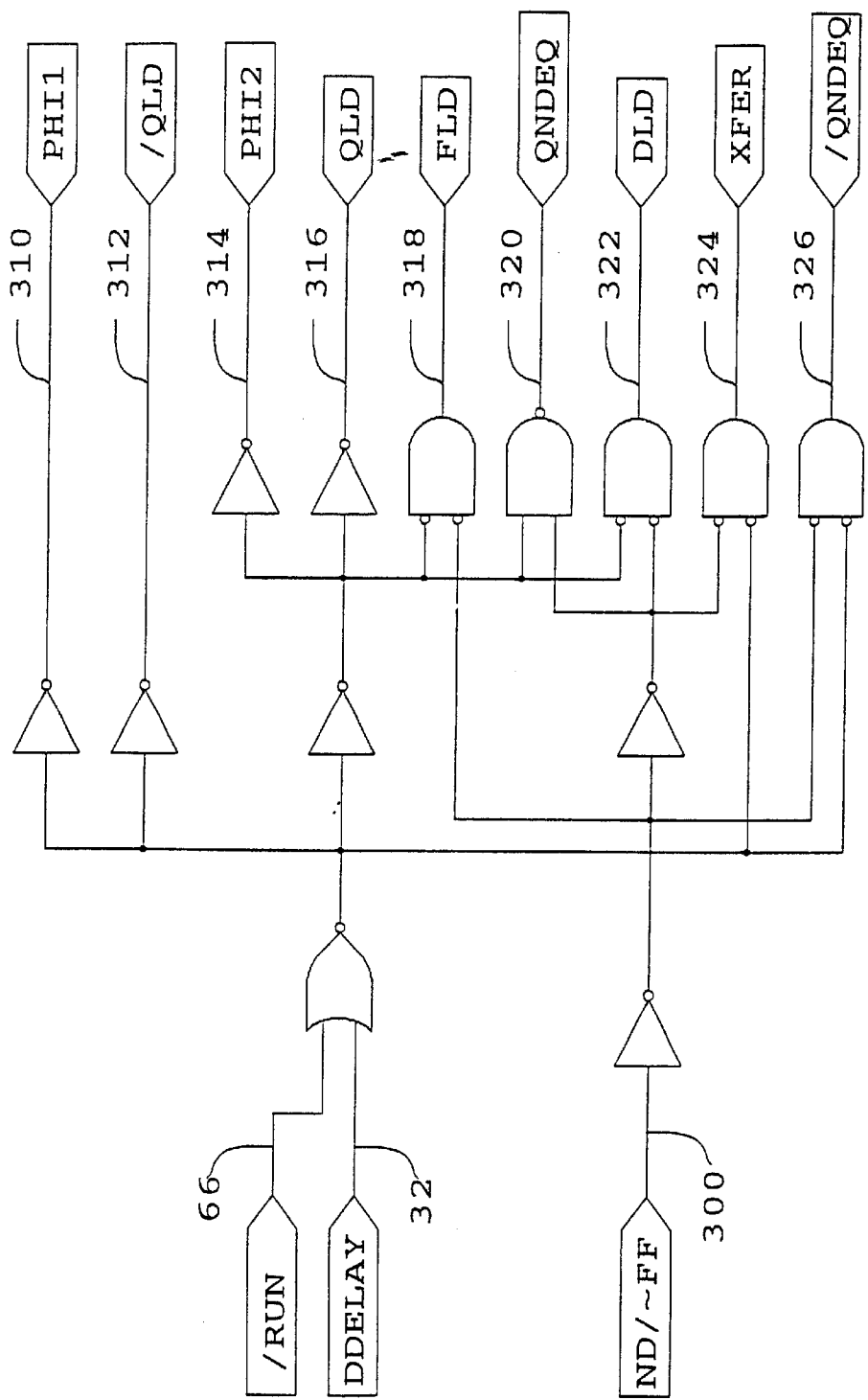
FIG. 6 is a logic diagram of control logic for controlling the nondeterministic elements of FIGS. 4 and 5.

In a practical implementation in an integrated circuit, individual ND elements could be grouped, for example in groups of 8 or 16 such elements, and the control logic of FIG. 6 would be replicated for each group of ND elements. Each group would operate in either the deterministic (flip-flop) or nondeterministic mode for a given problem. The mode is selected by a ND/FF control signal (input at node 300 FIG. 6) which is provided by the control circuitry. So, for example, if 10 deterministic bits are required, the control circuitry would switch two groups of 8 ND elements to the deterministic mode of operation (FF). The "extra" 6 bits would simply not be connected in the C-RAM. Those bits would be excluded from all the clauses in the problem.

3. ND Element Timing and Control Logic

Transistors M1 and M2 provide a multiplexer function for selecting between deterministic inputs D and /D or a nondeterministic value which is fed back from the Q output via feedback path 98 and from the /Q output via feedback path 100, respectively, for latching the last nondeterministic decision. A control signal DLD ("deterministic load") indicates flip-flop mode of operation and gates external deterministic data D and /D into the circuit, while a mutually exclusive control signal FLD ("feedback load") indicates feedback operation and controls transistors M3–M4 to feedback the Q and /Q signals.

FIG. 6 illustrates logic circuitry to provide control signals for operating the circuitry of FIG. 5 in the manner described. Operation of the logic of FIG. 6 will become apparent when the logic diagram is taken together with the signal definitions shown in the following Table 2 and timing diagram of FIG. 11.

TABLE 2

| | Control Signal Definitions |
|---|---|
| D (/D) | deterministic input bit |
| DLD | deterministic load signal (flip-flop mode) |
| FLD | feedback load signal (ND mode) |
| XFER | master-slave transfer control signal |
| QNDEQ (/QDNEQ) | charge equalize control signal slave/ND stage |
| QLD (/QLD) | SLAVE/ND stage charge control signal |
| PHI1 (FIG.8) | precharge control for p-bit wide NOR gates 150 |
| PHI2 (FIG.9) | precharge control for q-bit wide NOR gate 65 |

IV. Detailed Circuit Descriptions

Figure 7:
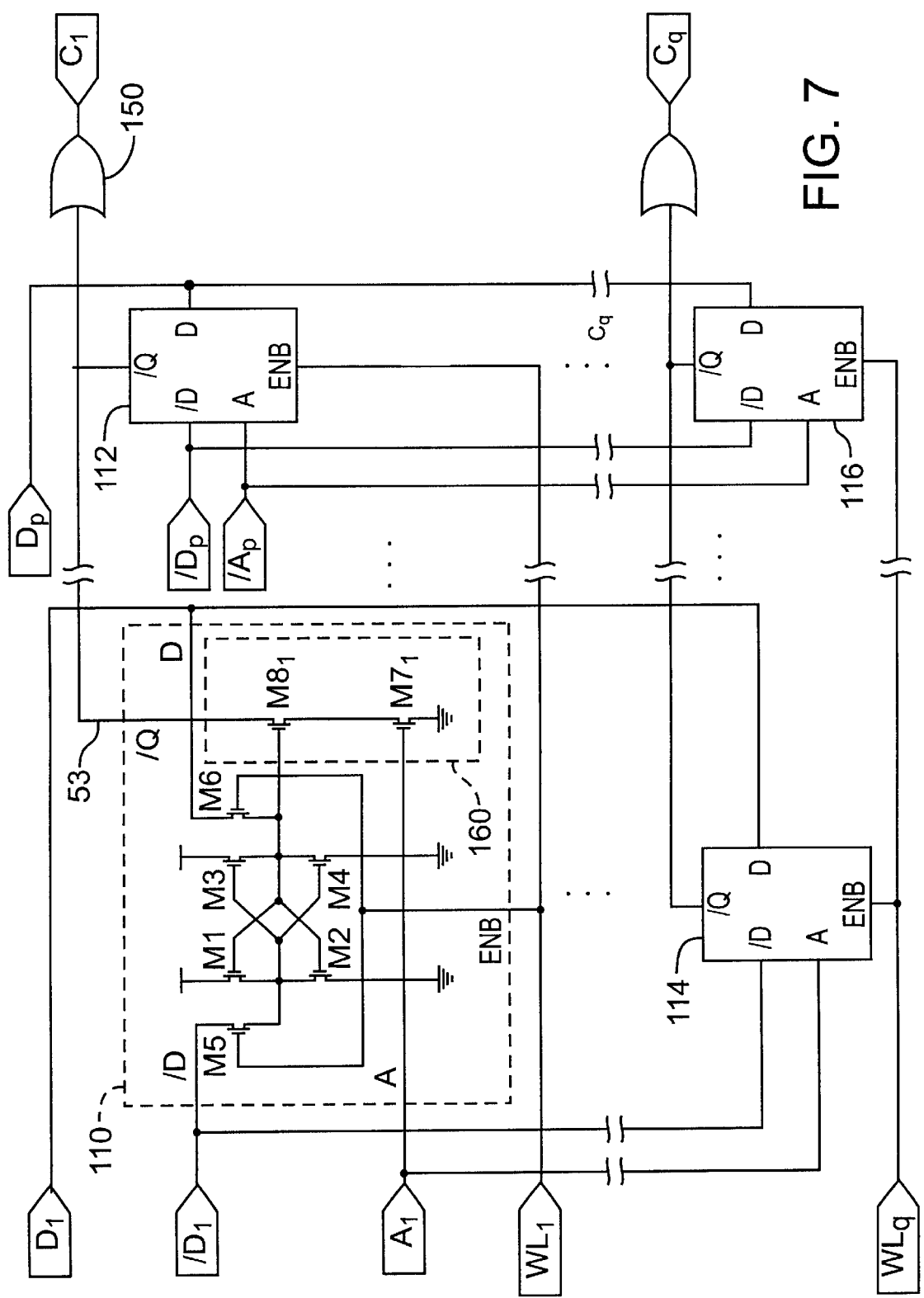
FIG. 7 is a partially-transistor level, partially-logic level diagram showing greater detail of the C-RAM of FIG. 3.

FIG. 7 is a diagram showing greater detail of the C-RAM of FIG. 3. In this diagram, each bit of the C-RAM circuitry is represented by a box, for example bit circuit 112 is the C-RAM bit circuit at row 1, column p, while bit circuit 114 is the C-RAM bit circuit at row q, column 1. Thus, the C-RAM comprises a rectangular array of individual bit circuits, the array having rows 1 through q (corresponding to q clauses) and columns 1 through p (corresponding to p variables). The row 1, column 1 bit circuit 110 is illustrated at the transistor level. Transistors M1, M2, M3, M4, M5 and M6 form a static memory cell. Writing the cell is controlled by an enable signal on a corresponding word line WL. Data for storage in the C-RAM memory cells are provided at data inputs D1 through Dp (and the respective complement inputs). The data, representing the problem of interest expressed as described above, may originate on the system data bus 12 (FIG. 1) or DRAM data bus 24 (FIG. 1). Operation of a memory cell of the type shown is known. Various other known memory cells can be used, depending on the applicable fabrication process, and trading off speed, power, density, etc. All such variations are merely engineering design choices and shall be considered equivalents within the scope of the present invention.

Each C-RAM bit circuit includes a crosspoint switch circuit. In bit circuit 110, transistors M71 and M81 form a crosspoint switch circuit 160. The data bit stored in the cell (reflected at the gate of M81) controls transistor M81 so as to couple (or not couple, depending on the state of the cell) the corresponding inverted probabilistic variable signal A1, via transistor M71, to an output node 53. Similarly, each of the other bit circuits in row 1 selectively couples a respective one of the remaining variable signals, A2 . . . /Ap to the row output node 53. All of the bit circuit outputs of the row are wire-ORed together at node 53, which in turn is input to an OR-gate 150 to provide the corresponding computed function output C1. Gate 150 actually functions as a NOR gate because each bit circuit output /Q is inverted and the NOR gate input is normally pulled high, as explained below. In the same manner, each of the other rows 2 . . . q of the C-RAM array selectively couples the inverted variable signals A1 . . . /Ap to a corresponding row output node. The row output node is input to a corresponding NOR gate to form the corresponding computed function C1 . . . Cq. In operation, each computed function indicates whether or not the clause computed in the corresponding row of the C-RAM is satisfied.

Figure 8:
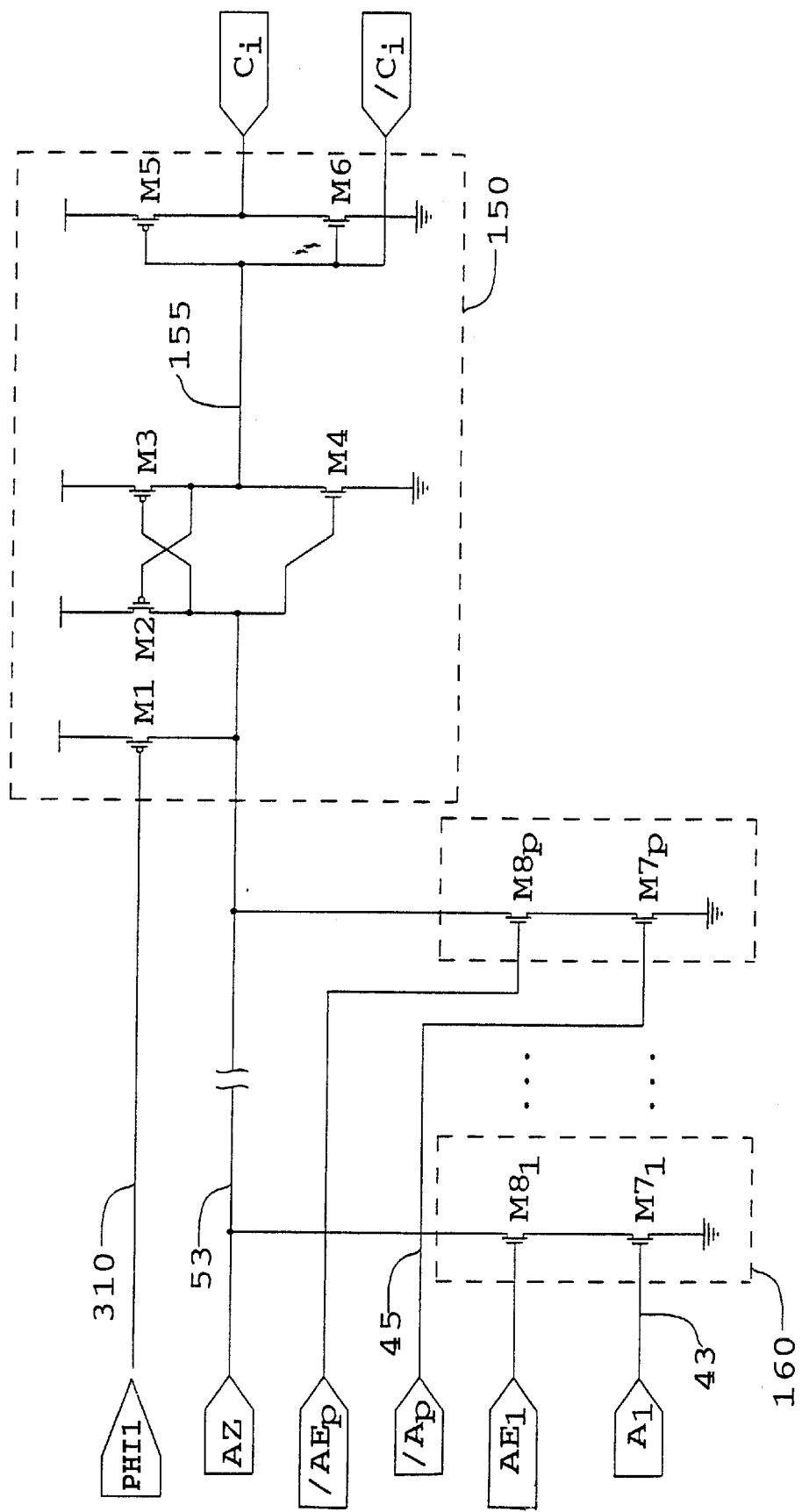
FIG. 8 is a transistor level schematic diagram showing detail of one row of crosspoint switch circuits and NOR gate 150 of the circuit of FIG. 7.

Referring now to FIG. 8, one row of crosspoint circuits, for example crosspoint circuit 160 (comprising transistors M71 and M81), is shown coupled to NOR gate 150. Memory enable signals AE1 through /AEp are coupled to the corresponding crosspoint switch circuits, respectively. These signals reflect the bits stored in the C-RAM. The inverted probabilistic variables A1 through /Ap are coupled to the crosspoint switch circuits, respectively, as noted above. The outputs of all of the crosspoint switch circuits in the row are coupled together at node 53 (also labeled AZ), and input to NOR gate 150. Identical circuitry is provided for each row of the C-RAM.

FIG. 8 also shows the NOR gate 150 in greater detail. Transistor M1 serves to precharge the input line 53 for resetting the gate, under control of the precharge control signal PHI1 at node 310. Transistors M2, M3 and M4 essentially form a latch, while transistors M5 and M6 provide an inverting output buffer circuit. In operation, node 53 is normally high, and is pulled low if any of the individual crosspoint circuits is on or true. Each crosspoint circuit essentially forms an NAND gate with open drain, its output being true (low) only if the corresponding enable signal (AEx) is true (i.e. the corresponding C-RAM memory bit is a one) and the corresponding variable (Ax) is true. Thus, a particular crosspoint switch will be on where the corresponding variable is included in the corresponding clause stored in the C-RAM, and that variable is true in the proposed solution. If any one or more of the crosspoint switches in a row is ON, node 53 is pulled low, and therefore the corresponding computed function C goes low, indicating the corresponding clause is satisfied, since each clause in the CNF formula is an OR function of the variables.

Figure 9:
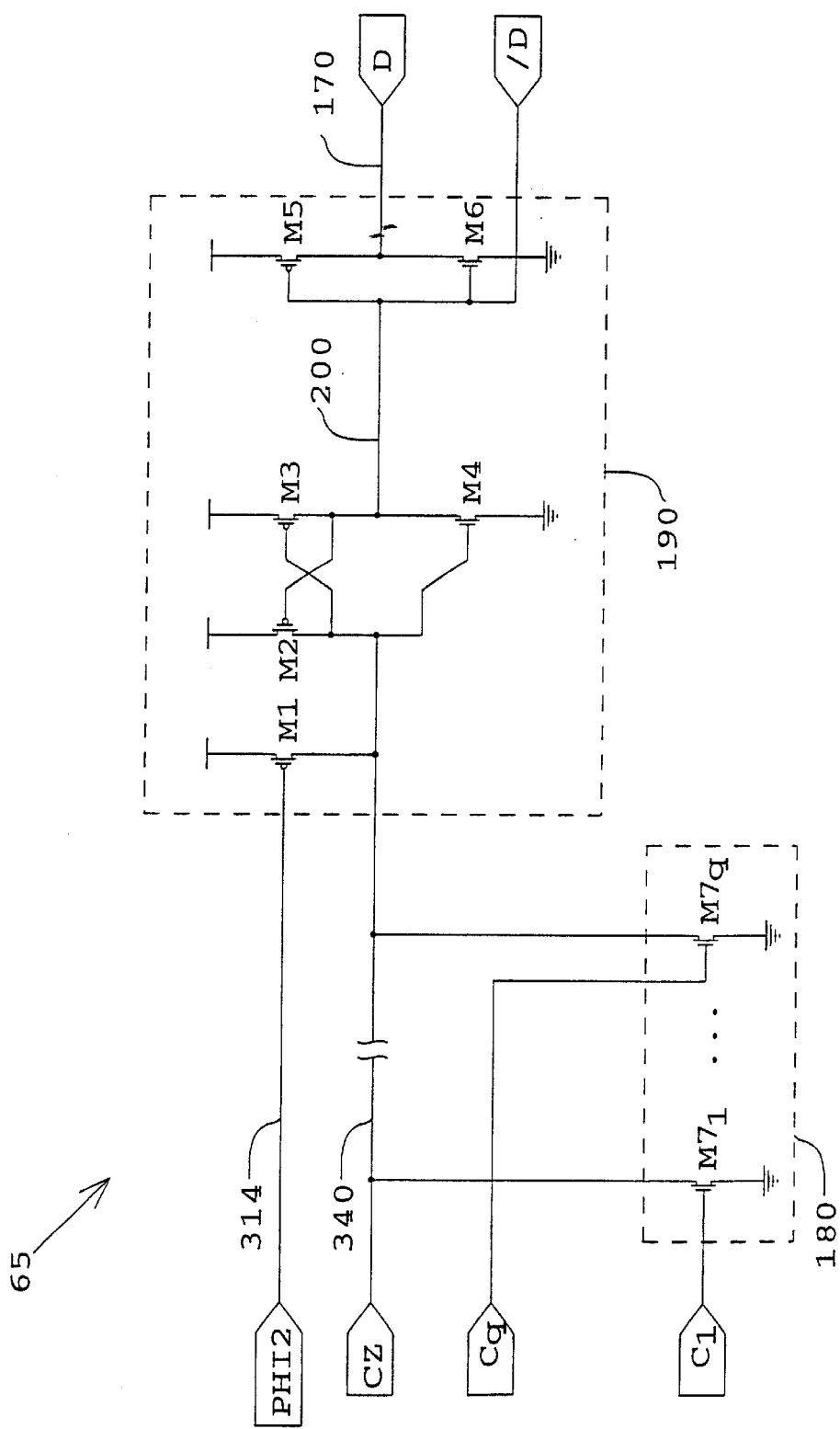
FIG. 9 is a transistor level schematic diagram of a q-bit wide NOR gate 65 of FIG. 4.

FIG. 9 is a transistor level schematic diagram of the q-bit wide NOR gate 65 of FIG. 4. It may be recalled that NOR gate 65 receives as inputs all of the computed functions C1 . . . Cq (bus 58). Referring to FIG. 9, the computed functions C1 . . . Cq are applied to the gates of transistors M71 through M7q, respectively, in an input stage 180. The wired-OR function of all of these input signals appears at node 340 (CZ). CZ is input to OR gate 190. Gate 190 is essentially the same in form and function as gate 150 described above, so the details will not be repeated. The output of gate 190 provides the D signal at node 170 as well as the complement /D. This is the same D signal identified in FIG. 4 at the input to delay circuit 64. D is asserted (hi) if all clauses are satisfied. If any clause is not satisfied (C is high), then CZ and ergo D go low.

Figure 10:
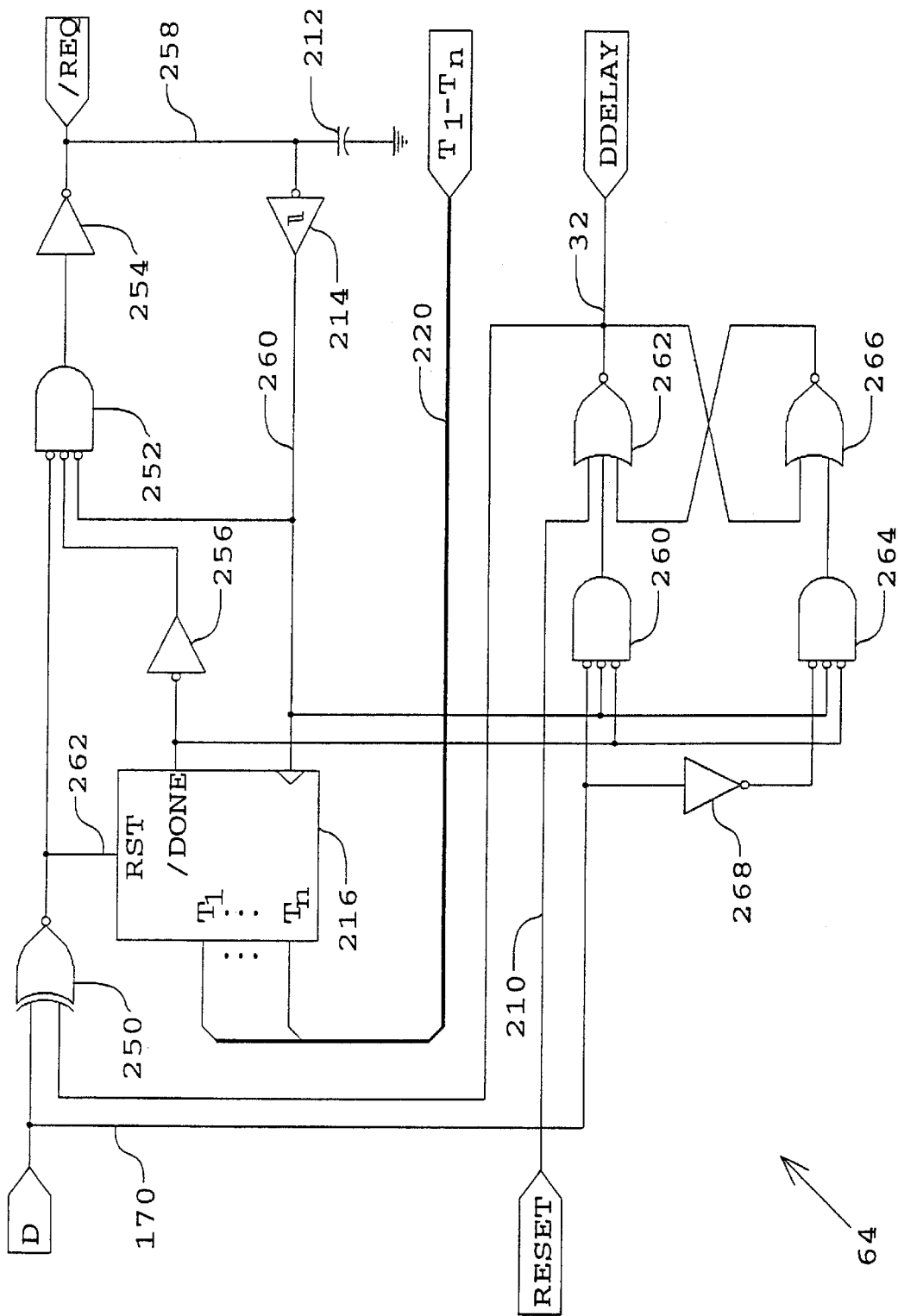
FIG. 10 is a schematic diagram of an asynchronous delay circuit generally corresponding to the delay element 64 of FIG. 4.

FIG. 10 is a schematic diagram of an asynchronous delay circuit generally corresponding to the delay circuit 64 of FIG. 4. The circuit of FIG. 10, after a predetermined delay period described below, asserts the signal DDELAY to commence a new cycle. Specifically, the reason for this delay circuit is to allow for storing interim data into the external DRAM after each cycle. At least a non-zero delay is necessary for the PCS circuit to function correctly. As a practical matter, the delay for writing to DRAM far exceeds the minimum required delay, which is an inverse monotonic function of the analog gain of the computational data path, so it is not an issue. For some applications where interim results are not required, the delay circuit can be omitted. In that case, parasitic capacitance will provide the minimum delay, while allowing the PCS circuit to run asynchronously at maximum speed.

Logic gates 252, 254 and 214 form an inverting loop. The Schmitt trigger 214 converts a capacitor 212 voltage to proper logic levels so that these components together form a free-running oscillator loop, as illustrated by the /REQ and CLK signals in the timing diagram of FIG. 11. The size of capacitor 212 is selected so as to provide an appropriate delay period for writing to the DRAM. The CLK signal appears at node 260, the Schmitt trigger output. Each cycle of this oscillator clocks counter 216, thereby incrementing its outputs T1–Tn at bus 220. Signals T1 - - - Tn generally indicate DRAM timing and control signals, the particulars of which will depend on the specific implementation. For example, if the PCS provides for 1028 variables, and the DRAM is 8 bits wide, then counter 216 can be arranged to count to 256 before overflow. In this case, T1–Tn can be arranged to provide strobes and addresses for storing the variables in 128 DRAM locations. When counter 216 overflows, the /DONE output goes low at the inputs to gate 256 and 264. Gate 256 drives gate 252 to stop the oscillator. The present state of the nondeterministic variables (the proposed solution) has been stored in the DRAM.

Logic gates 260, 262, 264, 266 and 268 together form a C-gate circuit. The C-gate receives the D input 170, the /DONE signal from counter 216 and the CLK signal 260. The C-gate output at node 32, DDELAY, controls the start of a new cycle. It reflects whatever state appeared at D changes state on the next clock cycle after the counter overflows and D changes state. A RESET control signal at node 210 forces start of a new cycle. It is provided by the control logic, e.g. to begin a computation. DDELAY also is fed back to gate 250 to counter 216 reset input 262 and oscillator gate 252.

VI. Summary of Operation

Figure 11:
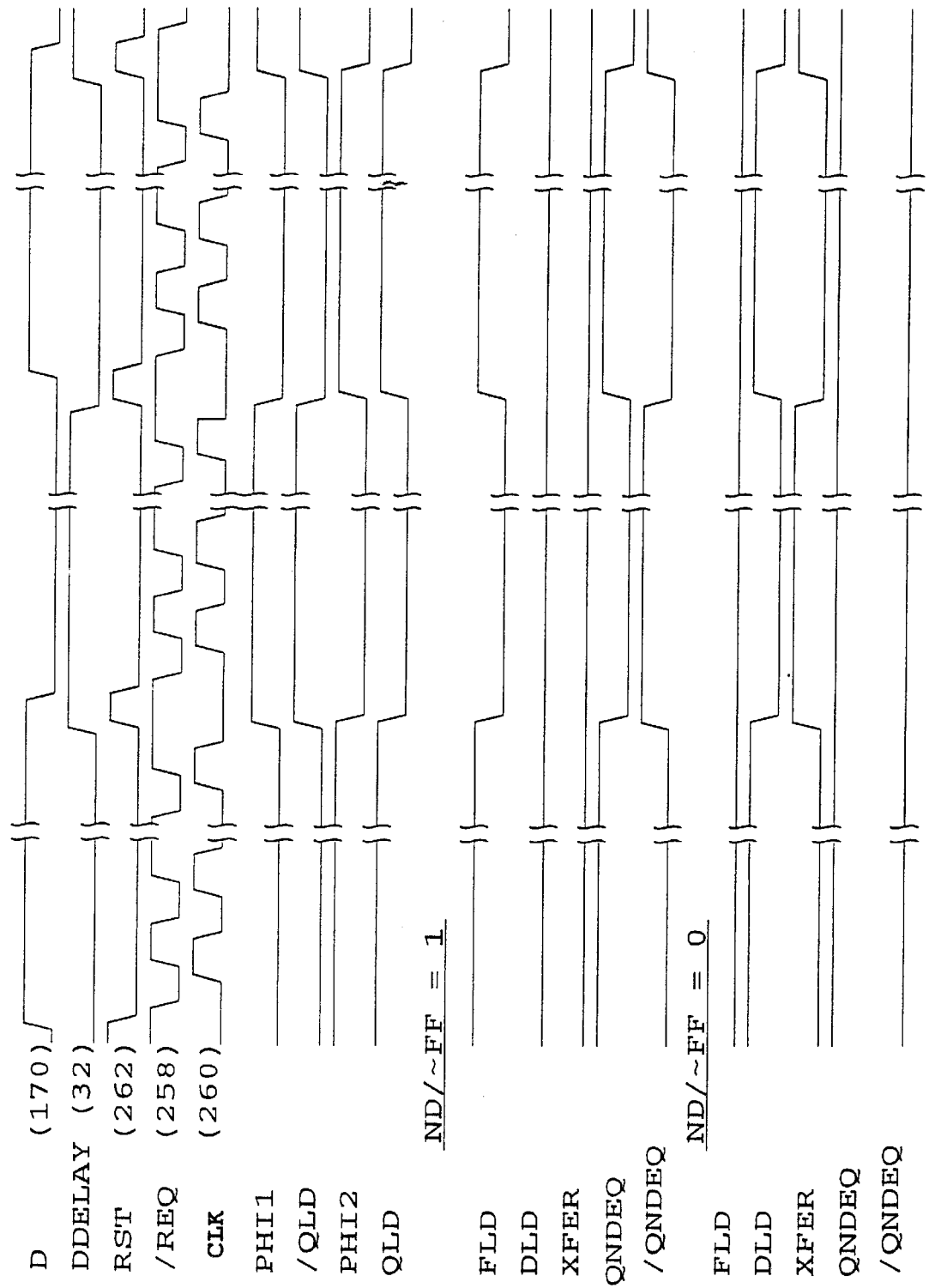
FIG. 11 is a timing diagram illustrating control signals generated by the control logic of FIG. 6 and FIG. 10 in operation.
Figure 12:
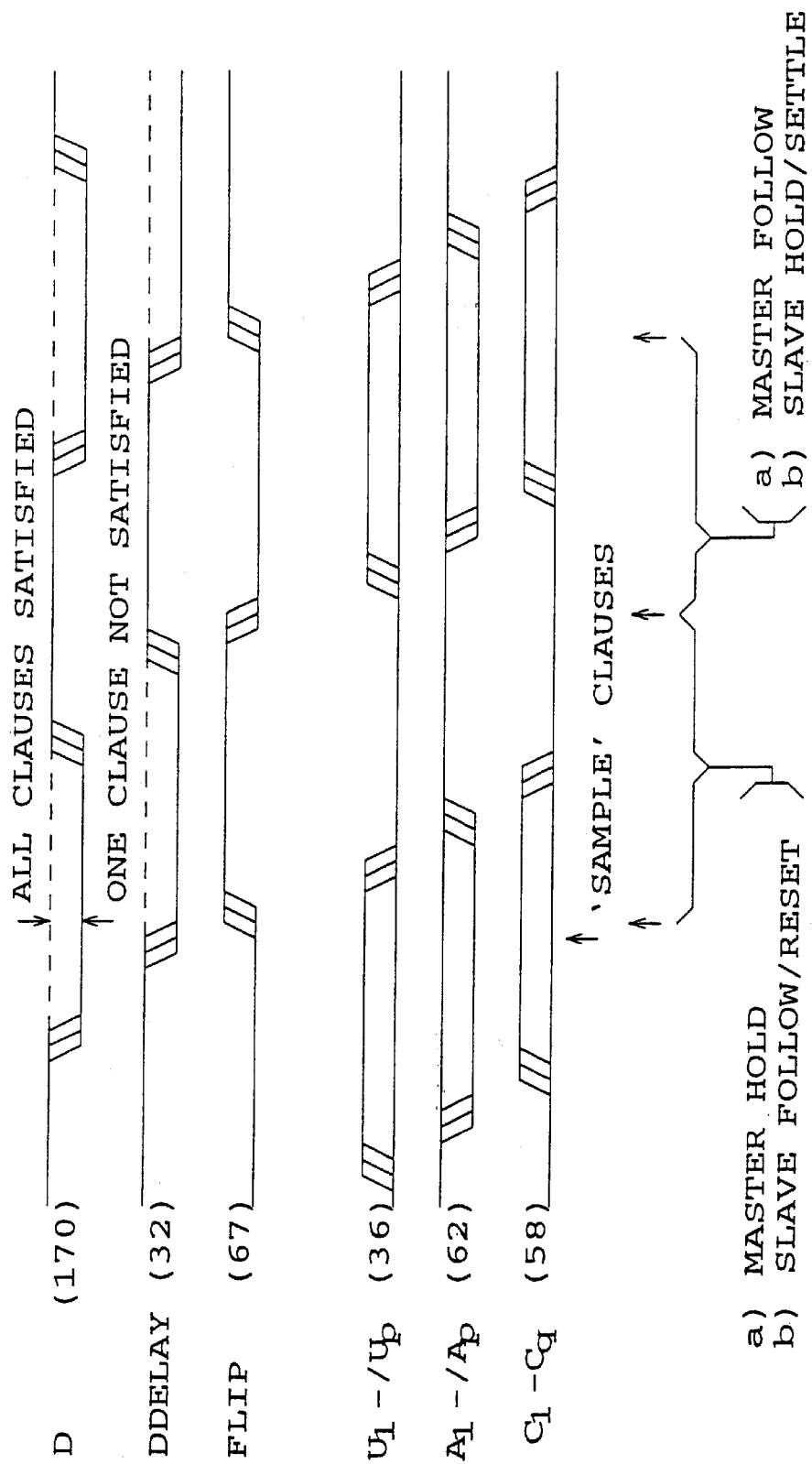
FIG. 12 is a timing diagram illustrating overall operation of the probabilistic computing system according to the invention.

Operation of the PCS system is summarized with reference to the timing diagrams of FIGS. 11 and 12. Referring to FIG. 12, a new set of probabilistic values U1–/Up are generated in the ND subsystem, some of which may be predetermined. FIG. 11 shows the control signal timing for both the ND elements operating in nondeterministic mode (ND/~FF=1) and those operating in the deterministic mode (ND/~FF=0). Inverted variables A1–/Ap follow by a few gate delays and are applied to the C-RAM. There the computed functions C1–Cq are formed, and these determine a new state of D. D is low, indicating that at least one clause is not satisfied. After delay, DDELAY goes low and /FLIP goes high, to synchronize and begin a new cycle. Note that the system runs asynchronously. For example, the inverted variables pass through the cross-point switch with only a few gate delays, and each computed function C will change state as soon as the corresponding clause is first satisfied (even if some bits lag behind). Similarly, D goes low as soon as one computed function indicates that the corresponding clause is not satisfied; it does not wait for other clauses to be determined. These features have the advantage of very high speed of operation. As noted, significant delay is inserted only as necessary for saving interim results.

The time complexity of the computation carried out by the system is summarized as follows. Due to processing imperfections, it should be expected that each of the probabilistic variables A1, A1 . . . Ap is biased and correlated. Ignoring the correlation effects for the moment, let M represent the set of 2p possible assignments for the probabilistic variables. The probability that the system finds a solution on a single attempt is:

$$Q = \Sigma P[\text{occurrence of } m]$$

m in M

To accommodate the effect of biases, it is reasonable to assume that an upper bound Q' exists on the probability that the system does not find a solution on a single attempt:

$$1 > Q' = q(2p-m) >= 1-Q$$

It follows that a lower bound on the probability that the system with p variables finds a solution in k attempts to a problem with m solutions is:

$$P(p,m,k) = 1 - [q(2p-m)]^k$$

Therefore, the number of attempts K needed to insure that a solution is found with probability P is:

$$K > \frac{\log(1-P)}{\log(2p-m) + \log q} = \frac{\log[1/(1-P)]}{\log 1/q - \log(2p-m)}$$

To study this result further, it is reasonable to assume that 1/q scales exponentially with p:

$$1/q = 2p/r$$

so that $$K > \frac{\log[1/(1-P)]}{\log r + p - \log(2p-m)}$$

It follows immediately that a solution is found in a constant number of tries determined solely by P and m if m scales as $$m > 2^{p-1}$$

since $$\log(2^p - m), \log 2p - 2^{p-1}) = p - 1$$

and therefore $$\frac{\log[1/(1-P)]}{\log r + 1} = \frac{\log[1/(1-P)]}{\log r + P - \log(2^p - m)}$$

As mentioned earlier, in addition to biases, it should also be expected that successive assignments for each of probabilistic variables A1, A2 . . . Ap will be correlated to some degree. It is the nature of VLSI physics, however, that the correlation between the k-th and the j+k-th attempt decreases rapidly with j and is virtually nil for some relatively small J. As a result, every J-th attempt can be considered to be uncorrelated and the number of attempts needed to insure that a solution is found with at least probability P is JK (which is still constant), V. Alternative Embodiments The circuitry described above for probabilistic computing could be implemented together with a microprocessor in a single integrated circuit. The current state of the art in terms of density and memory size might require sacrificing some of the parallelism of the C-RAM. In such an alternative embodiment, individual clauses or even parts of clauses may be evaluated serially due to memory and gate density limitations. Another alternative would be to implement the probabilistic circuitry in a stand-alone special purpose processor. Again, depending on the process, technology, etc., such an implementation may or may not include adequate RAM on board for parallel processing multiple clauses. Various integration schemes, trading off performance, packaging density, power etc. may be used, all of which involve design choices that fall within the scope of the present invention and thus are to be considered equivalents of the embodiments discussed herein.

A further alternative embodiment is to implement the functionality described above using commercially available off-the-shelf programmable logic devices such as for example, the Intel flexlogic family of PLDs that include bistable set-reset storage elements in which both set and reset can be programmed to be active simultaneously and for which neither set or reset is dominant, (i.e., activating both set and reset puts the storage element in an unstable state rather than the set of reset state). The necessary circuitry could be implemented in such PLDs combined with adequate external memory to store the data that would otherwise appear in the C-RAM. PLD implementations should be considered equivalent to the preferred embodiment disclosed above in greater detail.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A nondeterministic logic circuit for generating random boolean values of one or more variables as a proposed solution to a computing problem expressed in conjunctive normal form as one more clauses in said one or more variables, the logic circuit comprising:
   one nondeterministic logic element for generating a respective random boolean value for each one of the said one or more variables; and
   each nondeterministic logic element comprising:
   a cross-coupled pair of transistor inverter circuits;
   means for controlling power to the cross-coupled pair of transistor inverter circuits; and
   means for equalizing charge on the gates of the transistor inverter circuits while power is removed from the cross-coupled pair, thereby driving the cross-coupled pair to an unstable equilibrium, whereby intrinsic circuit noise will cause the cross-coupled pair to randomly assume one of two stable states when power is restored to the cross-coupled pair, the stable state assumed by the cross-coupled pair providing a probabilistically selected random boolean value and further comprising common synchronization means coupled to all of the nondeterministic logic elements for synchronizing operation of the nondeterministic logic elements.

2. A hardware probabilistic computing system comprising:

memory means for receiving and storing a digital representation of a predetermined combinatorial computing problem expressed as a series of clauses in conjunctive normal form, the memory means including a plurality of rows of memory cells, each row arranged for storing a series of data bits corresponding to a respective clause of the computing problem;

nondeterministic logic means for generating a first set of random boolean values of a series of variables as a first proposed solution to the stored computing problem, the nondeterministic logic means including a series of semiconductor nondeterministic logic elements, each nondeterministic logic element arranged for generating a respective one of the random boolean values, and the series of semiconductor nondeterministic logic elements being coupled together so as to generate the random boolean values for all of the variables substantially concurrently in response to a single flip control signal;

testing means coupled to the memory means and to the nondeterministic logic means, the clause testing means including, for each row of the memory means, first logic means coupled to the corresponding row of the memory means and coupled to the nondeterministic logic elements for providing a respective computed function signal that indicates whether the series of random boolean values satisfies the corresponding clause of the computing problem;

second logic means coupled to receive all of the computed function signals for determining and indicating that the first proposed solution does not satisfy the computing problem as soon as any one of the computed function signals indicates, by its logic state, that the corresponding clause of the problem is not satisfied; and feedback means coupled to the second logic means for asserting the flip signal to generate an alternative set of random boolean values as an alternative proposed solution to the computing problem responsive to the second logic means indicating the first proposed solution does not satisfy the computing problem, so that the nondeterministic logic means, the clause testing means, the second logic means and the feedback means together form a hardware loop operable asynchronously.

3. A probabilistic computing system according to claim 2 wherein:

the first logic means comprises a series of crosspoint switch circuits, each crosspoint switch circuit being coupled to receive a respective bit of the corresponding row of the memory means;

each crosspoint switch circuit further being coupled to receive the corresponding variable signal;

and each crosspoint switch circuit including means for coupling the corresponding probabilistic variable signal to a common circuit node only if the said respective bit has a first predetermined logic state; and the first logic means further comprises a logic gate coupled to the common circuit node for asserting the computed function signal responsive to such of the probabilistic variable signals as are coupled to the common circuit node by the crosspoint switch circuits so as to indicate whether the first series of random probabilistic variable values satisfies the corresponding clause of the computing problem.

4. A probabilistic computing system according to claim 4 wherein the second logic means comprises a NOR gate having a number of inputs at least equal to the number of clauses in the computing problem.

5. A probabilistic computing system according to claim 2 wherein:

the testing means includes an array of logic gates and a crosspoint switch array controllably interconnecting the nondeterministic logic means and the logic gates, the crosspoint switch array also being coupled to the memory means so that the crosspoint switch array couples selected ones of the said variables to the logic gates responsive to the representation of the computing problem stored in the memory means, whereby each logic gate computes a logical function of a subset of the variables, the subset being defined by data stored in the memory.

6. A probabilistic computing system according to claim 2 further comprising a DRAM type of interface means for storing intermediate results in a second memory.

7. A probabilistic computing system according to claim 2 further comprising a DRAM type of interface means for interfacing the probabilistic computing system to a host processor as a memory-mapped peripheral device.

8. A hardware probabilistic computing system comprising:

memory means for receiving and storing a digital representation of a predetermined combinatorial computing problem expressed as a Boolean function;

nondeterministic logic means for generating a first set of random boolean values of a series of variables as a first proposed solution to the stored computing problem, the nondeterministic logic means including a series of semiconductor nondeterministic logic elements, each nondeterministic logic element having a pair of outputs arranged for generating a respective one of the random boolean values and its logical complement, and the series of nondeterministic logic elements being coupled together and arranged so as to assert both the uncomplemented and complemented outputs for all the variables to a first predetermined logical state in response to receiving a common flip control signal asserted to a predetermined logical 'reset' state, and arranged so as to generate the random boolean values for all of the variables substantially concurrently in response to the flip control signal switching from the 'reset' state to a logically complementary 'generate' state;

configurable logic means having the pairs of outputs from the nondeterministic logic means, as input pairs and having a single output and including means for computing the Boolean function of the input pairs;

the configurable logic means including a circuit which computes the Boolean function such that the output of the configurable logic means assumes a first predetermined logical value—a 'satisfied' value—when the flip control signal is in the logical 'reset' state and both outputs in every output pair of the non-deterministic logic means representing the true and complemented random variables are asserted to a first predetermined logic state;

the output of the configurable logic means assuming a logically complementary 'unsatisfied' value when the set of random Boolean values generated by the non-deterministic logic means in response to assertion of the flip control signal to the 'generate' value is not a solution to the computing problem represented by the Boolean function;

the output of the configurable logic means further assuming the 'satisfied' value when the set of random Boolean values generated by the non-deterministic logic means in response to assertion of the flip control signal to the 'generate' value is a solution to the computing problem represented by the Boolean function; and the configurable logic means further arranged such that if the output of the configurable logic means changes from the 'satisfied' value to the 'unsatisfied' value when one output pair of the non-deterministic logic means changes to the state in which the outputs have random complementary values in response to assertion of the single flip signal to the 'generate' value, the configurable logic means output cannot change back to the 'satisfied' value as each of the remaining output pairs of the non-deterministic logic change to the state in which those outputs have a random complementary values in response to the assertion of the single flip signal to the 'generate' value; and feedback means coupled to the output of the configurable logic means for asserting the flip signal to the 'generate' state to generate an alternative set of random boolean values as an alternative proposed solution to the computing problem responsive to the output of the configurable logic means assuming the 'unsatisfied' value so that the nondeterministic logic means, the configurable logic means and the feedback means together form a hardware loop operable asynchronously.

9. A hardware probabilistic computing system according to claim 8 wherein:

the memory means includes a plurality of rows of memory cells, each row arranged for storing a series of data bits corresponding to a respective clause of the computing problem and comprising a series of bits, each bit such corresponding to a respective one of the variables;

the configurable logic means includes, for each row of the memory means, first logic means coupled to the corresponding row of the memory means and coupled to the nondeterministic logic means for providing a respective computed function signal that indicates whether the series of random boolean values satisfies the corresponding clause of the computing problem; and second logic means coupled to receive all of the computed function signals for determining and indicating that the first proposed solution satisfies the computing problem when all of the computed function signals indicate that the corresponding clauses of the problem are satisfied.

10. A hardware probabilistic computing system according to claim 9 wherein:

the first logic means comprises a series of crosspoint switch circuits, each crosspoint switch circuit being coupled to receive a respective bit of the corresponding row of the memory means;

each crosspoint switch circuit further being coupled to receive the corresponding variable signal from the nondeterministic logic means;

and each crosspoint switch circuit including means for coupling the corresponding probabilistic variable signal to a common circuit node only if the said respective bit has a first predetermined logic state; and the first logic means further comprises a logic gate coupled to the common circuit node for asserting the computed function signal responsive to such of the probabilistic variable signals as are coupled to the common circuit node by the crosspoint switch circuits so as to indicate whether the first set of random Boolean values satisfies the corresponding clause of the computing problem.

\* \* \* \* \*